United States Patent [19]

Hirai et al.

[11] Patent Number: 4,900,781

[45] Date of Patent: Feb. 13, 1990

[54] PROCESS FOR MODIFYING ADDITION POLYMERIZATION PLASTICS

[75] Inventors: Yasuo Hirai; Toshio Niwa, both of Yamaguchi, Japan

[73] Assignee: Kayaku Noury Corporation, Tokyo, Japan

[21] Appl. No.: 105,227

[22] Filed: Oct. 7, 1987

[30] Foreign Application Priority Data

Oct. 17, 1986 [JP] Japan ................................ 61-245321

[51] Int. Cl.$^4$ ............................................. C08F 8/50
[52] U.S. Cl. .............................. 525/387; 525/326.2; 525/329.2; 525/330.3; 525/331.5; 525/333.3; 525/333.8
[58] Field of Search ........................................ 525/387

[56] References Cited

U.S. PATENT DOCUMENTS 4,072,807 2/1978 Uraneck et al. .................. 526/48.1

FOREIGN PATENT DOCUMENTS 999698 11/1976 Canada .
884074 12/1961 United Kingdom .

*Primary Examiner*—Joseph L. Schofer
*Assistant Examiner*—Bernard Lipman
*Attorney, Agent, or Firm*—Oliff & Berridge

[57] ABSTRACT

A process for modifying addition polymerization plastics is disclosed. According to the process, an organic peroxide is adsorbed on a zeolite, mixed with an addition polymerization plastic and heat-treated. The process produces an addition polymerization plastic having an increased melt flow index.

6 Claims, No Drawings

PROCESS FOR MODIFYING ADDITION POLYMERIZATION PLASTICS

The present invention relates to a process for modifying an addition polymerization plastic wherein organic peroxide is mixed with addition polymerization plastic then the mixture is heated. More particularly, the invention relates to an improved process for chemically increasing the melt flow index (hereinafter referred to as MFI) of particularly crosslinkable plastics among the addition polymerization plastics and a process for chemically further increasing the MFI of degradable plastics.

Polymers are classified into those of addition polymerization, condensation polymerizatioin, addition condensation, ring-opening polymerization and polyaddition types according to the reaction employed in the preparation of them.

Among these polymers, those of the addition polymerization type are prepared by opening double bonds of monomers using a radical or an ion as an initiating species and propagating a chain reaction to other monomers to form a polymer. Addition polymerization polymers may be classified as either elastomers, such as rubbers, or plastics.

The addition polymerization plastics may be subdivided into two groups. The first group, identified as crosslinkable plastics, are crosslinked when they are heat-treated together with a suitable amount of an organic peroxide. This lowers the melt flow index and causes gelation. The second group, identified as degradable plastics have a polymer chain which is cleaved preferentially when they are heat-treated as mentioned above, causing an increase in the MFI. Examples of the polymers of the first group include polyethylene (hereinafter referred to as PE), low-density polyethylene (LDPE), high-density polyethylene (HDPE), polyvinyl chloride (PVC), polyvinyl acetate (PVAC), polyvinyl fluoride (PFV), polystyrene, (PS), polymethyacrylates (PMA) and copolymers such as ethylene/vinyl acetate copolymer (EVA) and styrene/acrylonitrile copolymer (SAN). Examples of the polymers of the second group include polypropylene (PP) and poly-$\alpha$-methylstyrene (PMS).

The opposite results produced by heat-treating the two groups of addition polymerization plastics may be theoretically explained as follows. As the organic peroxide dispersed in the plastic is heated, it forms a radical which pulls out a hydrogen atom from the polymer chain to form a polymer radical. Either the polymer radical participates in a crosslinking reaction or the polymer chain is cleaved according to $\beta$-cleavage mechanism.

In fact, when a mixture of said crosslinkable plastic and an organic peroxide is heat-treated, the MFI of the plastic is reduced or it gels. No process has been known for increasing the MFI of the plastics of this type by a chemical treatment for th purpose of modifying them. One process for increasing the MFI of crosslinkable plastics is known. That process comprises adding a plasticizer, oil or low-molecular polymer to the plastics to plasticize them.

Among the degradable plastics, polypropylene has been treated with an organic peroxide to increase the MFI.

In the above-mentioned process wherein the MFI of the crosslinkable plastics is increased by the addition of a plasticizer, oil or low-molecular polymer, the additive must be used in an amount as large as several ten to several hundred percent based on the plastic. This causes problems such as the migration of the added plasticizer and adverse influences on the electric and physical properties such as heat resistance and hardness of the polymer.

In the process for increasing the MFI with an organic peroxide which has been applied practically to only polypropylene, problems such as coloring and odor due to the organic peroxide have been pointed out.

The present invention provides a process for increasing the MFI of the crosslinkable plastics by a chemical means without using any plasticizer or the like. The invention provides also a process for increasing the MFI of the degradable plastics without causing color or smelling.

The above-mentioned problems can be solved by mixing an organic peroxide adsorbed on a zeolite (hereinafter referred to as "the present ingredient") with an addition polymerization plastic and then heat-treating the plastic under a suitable temperature condition.

The inventors have found that when an organic peroxide adsorbed on a zeolite is mixed with the crosslinkable plastic and the mixture is treated under a suitable temperature condition, the organic peroxide acts to cleave the polymer chain. This is in contrast to conventional processes wherein the organic peroxide causes crosslinking and thereby reduces the MFI. The present invention has been completed on the basis of this new function of the present ingredient.

Further, according to the present invention, the effects of the organic peroxide on the degradable plastics are improved so remarkably that the amount of the organic peroxide can be reduced.

The MFI of the crosslinkable plastics can be increased chemically and so is the MFI of polypropylene without causing color or odor problems.

According to a conventional process an organic peroxide may be mixed with plastic or rubber in the form of a compounding ingredient prepared by dispersing the peroxide in a diluent comprising an inorganic filler such as calcium carbonate, clay or silica for the purposes of realizing a homogeneous dispersion, improving the accuracy of weighing and securing safety. However, the function of zeolites used in the present invention is different from that of the fillers such as calcium carbonate used in the prior art.

Namely, the zeolites used in he present invention act as an element to alter the chemical effect of the organic peroxide on the crosslinkable plastics from that of crosslinking to that of cleaving, while the filler used in the prior art acts as a mere diluent for the organic peroxide.

Though a composition comprising a curable rubber or resin and a molecular sieve on which an organic peroxide, i.e. a curing agent for the rubber or resin, is adsorbed is disclosed in the specification of Japanese Patent Publication No. 5889/1961, the present invention is different therefrom with respect to the technical contents. More particularly, the composition disclosed in said specification comprises curable rubbers and resins, for example, elastomers such as butadiene/acrylonitrile copolymer, butadiene/styrene copolymer and natural rubber and curable resins such as unsaturated polyester resins and polyvinyl chloride plastisol containing a reactive monomer, which are different from the plastics of the present invention. Namely, the plastics of the present invention are distinguished from the elastomers such as rubbers, since the former having a fluidity at an elevated temperature and a practical strength at an ambient temperature. Curable, unsaturated polyester resins containing reactive monomers or plastisols are not included in the present invention.

It is described in the specification of said Japanese Patent Publication No. 5889/1961 that the first object of the invention disclosed therein is to provide a curing composition which does not exert harmful influences on the curable substances prior to the curing reaction, the second object thereof is to provide a curing composition which does not interfere with the effects of the curing agent having high volatility and reactivity in the curing reaction of a natural or synthetic elastomer, resin or natural rubber, and the third object thereof is to provide a curing composition the quality of which is not deteriorated during the storage even when it is mixed with a curable substance. Thus, the organic peroxide is adsorbed on zeolite so as to protect the same used as the curing agent for the curable rubber or resin in said invention.

On the contrarty, the present invention has been completed based on the finding that when the present inngredient is mixed with a crosslinkable plastic and the mixture is heat-treated, the chemical effect of the organic peroxide can be changed from that of accelerating the crosslinking to that of accelerating the bond cleavage. Also, the effects of the organic peroxides on the degradable plastics can be made further efficient.

Since the present ingredient exhibits its effects of attaining said objects even when it is used in a small amount, it scarcely affects the physical properties of the polymer, unlike the addition of the plasticizer, oil or low molecular weight polymer to reduce the MFI. When PVC was mixed with the present ingredient and the obtained mixture was heat-treated to increase the MFI thereof, the discoloration caused was less than that caused when the heat treatment was effected in the absence of any additive (blank test). This effect of the present ingredient is also a new one, since an adverse effect is observed when PVC is heat-treated with the organic peroxide according to the conventional process.

The zeolites used in the present invention include natural zeolites such as mordenite, erionite, clinoptilolite, heulandite and faujasite and synthetic zeolites such as A, X, Y, T and F zeolites, molecular sieves and synthetic mordenite. These zeolites can be used in various forms such as powders, granules and pellets.

Examples of the organic peroxides used in the present invention include hydroperoxides such as t-butyl, cumene and 2,4,4-trimethylpentyl hydroperoxides; dialkyl peroxides such as di-t-butyl peroxide, dicumyl peroxide, 2,5-dimethyl-2,5-di-t-butylperoxyhexane, t-butyl cumyl peroxide, 2,5-dimethyl-2,5-di-t-butylperoxyhexane-3 and α,α'-di(t-butylperoxyisopropyl)benzene; peroxy ketals such as 1,1di-t-butylperoxycyclohexane and 2,2-di(t-butylperoxy)butane; alkyl peresters such as t-butyl peroxybenzoate, t-butyl peroxyacetate, t-butyl peroxy-3,5,5-trimethylhexanoate, di-t-butyl peroxyazelate and t-butyl peroxyisobutyrate; diacyl peroxides such as benzoyl, 2,4-dichlorobenzoyl, p-chlorobenzoyl and o-methylbenzoyl peroxides; ketone peroxides such as methyl ethyl ketone, methyl isobutyl ketone and cyclohexanone peroxides; and percarbonates such as t-butylperoxyisopropyl carbonate, t-butylperoxy-sec-butyl percarbonate and bis(4-t-butylcyclohexyl)peroxydicarbonate.

The composition contains 1 to 50%, preferably 3 to 40% of the organic peroxide.

The organic peroxide is adsorbed on the zeolite by mixing the former with the latter at room temperature in case the former is liquid at room temperature, or by mixing the former with the latter at a temperature above the melting point of the former or by dissolving the former in a solvent, mixing them together and removing the solvent in case the former is solid at room temperature.

The organic peroxide is mixed with and thereby adsorbed on the zeolite by means of a ribbon blender, paddle mixer, mix master, pony mixer, Nauta mixer, concreate mixer, omni-mixer, V-type mixer, double-cone mixer or the like.

The amount of the organic peroxide to be added to the plastic according to the present invention is 50 to 30,000 ppm, preferably 100 to 10,000 ppm (in terms of a pure organic peroxide).

The term "addition polymerization plastics" herein includes homopolymers, graft polymers and copolymers prepared by radical, cationic and anionic polymerization processes. More particularly, they include low-density PE, high-density PE, PP, EPR, EPDM, EVA, PVAC, PVC, PMA, polymethyl methacrylate, PFV, PS, PIB, PMS, SBR and ABS.

The present ingredient can be mixed with these plastics in the form of pellets or powders by means of a Banbury mixer, paddle mixer, mix master, pony mixer, Nauta mixer, concrete mixer, omni-mixer, V-type mixer, double-cone mixer or kneader or, when the plastic is in the form of its solution in a solvent or plasticizer, the mixing can be effected by means of a kneader or universal stirrer.

After completion of the mixing, the heat treatment is effected under conditions which vary depending on the kind of plastic and the processing machine used. Such temperature and time conditions are typically in the ranges of 140° to 220° C. and 1 to 10 minutes.

The heat treatment can be effected by means of various processing devices, such as Banbury mixers, screw extruders, kneaders, and high-pressure presses or continuous crosslinking devices in which vapor, air, nitrogen gas or an inorganic salt is used as the heat transfer medium depending on the purpose.

The mixing and heat treatment can be effected in one step when a kneader or Banbury mixer having a heating means is used.

The MFI-increasing effect can be further improved by using the present ingredient in combination with a peptizer such as a Noctizer SK or a Noctizer SS, an antioxidant such as Sandostab P-EPQ or BHT and a processing stabilizer such as Sumilizer GM.

EXAMPLES

The following examples will further illustrate the present invention. The present ingredient are summarized in Table 1.

TABLE 1

| Ingredient | No. 1 | No. 2 | No. 3 | No. 4 | No. 5 | No. 6 | No. 7 |
|---|---|---|---|---|---|---|---|
| Organic peroxide | DIBP | 2.5 DM DTH | DCP | DIBP IB | TBH | TBPB | BPO |
| Content | 10% | → | → | → | → | → | → |

TABLE 1-continued

| Zeolite | Zeolam F-9 | → | → | → | → | → | → |
|---|---|---|---|---|---|---|---|
| Ingredient | No. 8 | No. 9 | No. 10 | No. 11 | No. 12 | No. 13 | |
| Organic peroxide | TBIC | DTBP | TBPB | TBIC | DTBP | TBPB | |
| Content | → | 30% | → | → | 10% | → | |
| Zeolite | → | Seviolite | → | → | Molecular sieve 13X | → | |
| Ingredient | No. 14 | No. 15 | No. 16 | No. 17 | No. 18 | No. 19 | |
| Organic peroxide | TBIC | DTBP | TBIC | 2.5 DM DTH | DTBP | 2.5 DM DTH | |
| Content | → | 20% | → | 40% | → | → | |
| Zeolite | → | Silton B | → | Calcium carbonate | Calcium carbonate | Clay | |

| | Ingredient | No. 20 | No. 21 | No. 22 | No. 23 |
|---|---|---|---|---|---|
| | Organic peroxide | 2.5 DM DTH | DTBP | 2.5 DM DTH | DTBP IB |
| | Content | → | 10% | 10% | 10% |
| | Zeolite | Silica | Clay | Clay | Clay |

1. Abbreviations of organic peroxides
DTBP: Kayabutyl D (di-t-butyl peroxide)
2,5 DMDTH: Kayahexa AD (2,5-dimethyl-2,5-di-t-butylperoxyhexane)
DCP: Kayacumyl D (dicumyl peroxide)
DTBPIB: Percadox 14 [α,α'-di(t-butylperoxyisopropyl)benzene]
TBH: Kayabutyl H (t-butyl hydroperoxide)
TBPB: Kayabutyl B (t-butyl peroxybenzoate)
BPO: Cadox B (benzoyl peroxide)
TBIC: Kayacarbon BIC (t-butyl isopropyl percarbonate)
MEKP: Kayamek M (methyl ethyl ketone peroxide)
2. Zeolites
Zeolam F-9: a product of Toyo Soda Mfg. Co., Ltd.
Seviolite: a product of Takeda Chemical Industried, Ltd.
Molecular Sieves 13 X: a product of Union Carbide Inc.
Silton B: a product of Mizusawa Kagaku Kogyo
3. Fillers
Calcium carbonate: NS-100 (a product of Nitto Funka Kogyo Co., Ltd.)
Clay: ST Clay (a product of Shiraishi Calcium Co., Ltd.)
Silica: Nipsil VN-3 (a product of Nippon Silica Industry Co., Ltd.)

EXAMPLES 1 TO 16 AND COMPARAIVE EXAMPLES 1 TO 7

15 g of dioctyl phthalate (DDP) was added to 30 g of PVC having an average degree of polymerization of 1,000 (a product of Tokuyama Sekisui Industry Co., Ltd.). The ingredient listed in Table 1 was added to the mixture or, in comparative examples, a zeolite or organic peroxide alone or an organic peroxide diluted with a filler was added thereto and mixed. The mixture was kneaded with two rolls (roll temperature: 145° to 155° C.). A part (20 g) of the mixture was taken and treated in a mold having a size of 128 mm×87 mm×2 mm at 200° C. for 2 min. The MFI of the samples was determined according to Japanese Industrial Standard K-7210. The results are summarized in Table 2.

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Additive | None | Zeolam F-9 | DTBP | Composition No. 17 | Composition No. 18 | Composition No. 19 | Composition No. 20 |
| Amount | — | 1.0 phr | 0.05 phr | 0.125 phr | → | → | → |
| MFI | 1.35 | 1.37 | 1.16 | 1.02 | 1.18 | 1.08 | 1.02 |
| Coloring of PVC | Brown | Light brown | Dark brown | Dark brown | → | → | → |

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Additive | Composition No. 1 | Composition No. 2 | Composition No. 3 | Composition No. 4 | Composition No. 5 | Composition No. 6 | Composition No. 7 | Composition No. 8 |
| Amount | 0.5 phr | → | → | → | → | → | → | → |
| MFI | 3.67 | 3.91 | 4.05 | 4.15 | 3.82 | 3.51 | 4.02 | 4.03 |
| Coloring of PVC | Light brown | → | → | → | → | → | → | → |

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Additive | Composition No. 9 | Composition No. 10 | Composition No. 11 | Composition No. 12 | Composition No. 13 | Composition No. 14 | Composition No. 15 | Composition No. 16 |
| Amount | 0.2 phr | → | → | 0.5 phr | → | → | 0.3 phr | → |
| MFI | 4.10 | 4.11 | 4.25 | 3.85 | 3.71 | 4.05 | 4.03 | 4.15 |
| Coloring of PVC | Light brown | → | → | → | → | → | → | → |

EXAMPLES 17 TO 25 AND COMPARATIVE

The MFI was determined according to Japanese Industrial Standard K-7210.

TABLE 3

|  | Comp. Ex. 8 | 9 | 10 | Example 17 | 18 | 19 | 20 | Comp. Ex. 11 |
|---|---|---|---|---|---|---|---|---|
| Polymer | LDPE | → | → | → | → | → | → | HDPE |
| Additive | Blank | DTBP | Zeolam F-9 | Ingredient No. 1 | Ingredient No. 5 | Ingredient No. 1 +P-EPQ | Ingredient No. 8 | Blank |
| Amount | — | 0.05 phr | 1 phr | 0.5 phr | 0.5 phr | 0.5 phr +1 phr | 0.5 phr | — |
| MFI | 1.45 | 0.94 | 1.26 | 1.63 | 1.72 | 2.15 | 1.75 | 2.35 |

|  | Comp. Ex. 12 | 13 | Example 21 | 22 | Comp. Ex. 14 | 15 | Example 23 | 24 | 25 |
|---|---|---|---|---|---|---|---|---|---|
| Polymer | HDPE | → | → | → | EVA | → | → | → | → |
| Additive | DTBP | Zeolam F-9 | Ingredient No. 1 | Ingredient No. 1 +P-PQE | Blank | DTBP | Ingredient No. 1 | Ingredient No. 1 +P-EPQ | Ingredient No. 5 |
| Amount | 0.05 phr | 1 phr | 0.5 phr | 0.5 phr +1 phr | — | 0.05 phr | 0.5 phr | 0.5 phr +1 phr | 0.5 phr |
| MFI | 1.72 | 2.15 | 2.56 | 3.52 | 1.92 | 1.20 | 2.55 | 3.86 | 2.82 |

EXAMPLES 8 TO 15

The present ingredient was added to LDPE, HDPE or EVA and the mixture was heat-treated. The MFI of each product thus obtained is shown in Table 3.

In these examples, the present ingredient was mixed with LPDE or EVA by means of two rolls at 110° to 120° C. or 80° to 90° C., respectively. Then, the mixture was heat-treated in the same mold as in Examples 1 to 16 at 200° C. for 10 min. and the MFI of each product was determined.

In case the sample was HDPE, the present ingredient was added to HDPE in fine powder form and the mixture was stirred with a glass rod in a beaker to obtain a homogeneous mixture. The obtained powdery mixture was heat-treated at 200° C. in the same mold as above for 10 min. and the MFI thereof was determined. In the blank tests of each polymer, additive-free polymer was heat-treated at 200° C. for 10 min. and the MFI thereof was determined.

EXAMPLES 26 TO 30 AND COMPARATIVE EXAMPLES 16 TO 24

The present ingredient was added to PP and the mixture was heat-treated. The MFI, color and smell of the product thus obtained are shown in Table 4.

In these examples, the present ingredient was added to fine powder of PP and the mixture was stirred with a glass rod in a beaker to obtain a homogeneous mixture. The obtained mixture was heat-treated at 200° C. in the same mold as above for 10 min. and the MFI thereof was determined according to Japanese Industrial Standard K-7210. The coloring and smell of the heat-treated sheets were judged as follows: three sheets of the sample each having a thickness of 2 mm were put together and the color was judged visually. The smell was judged by cutting the sheet to small pieces with scissors and smelling the same.

TABLE 4

|  | Comp. Ex. 16 | 17 | 18 | 19 | Ex. 26 |
|---|---|---|---|---|---|
| Additive | Blank | DTBP | 2.5 DM DTH | Ingredient No. 20 | Composition No. 1 |
| Amount of additive | — | 0.05 phr | 0.05 phr | 0.125 phr | 0.5 phr |
| MFI | 0.80 | 4.25 | 4.82 | 4.63 | 7.72 |
| Hue | Noncolored | Same as blank | Faint yellow | Faint yellow | Same as blank |
| Smell | None | None | Slight | Slight | None |

|  | 27 | 28 | 29 | 30 |
|---|---|---|---|---|
| Additive | Composition No. 1 | Composition No. 2 | Composition No. 12 | Composition No. 4 |
| Amount of additive | 0.3 phr | 0.5 phr | 0.5 phr | 0.5 phr |
| MFI | 4.52 | 7.93 | 8.12 | 7.81 |
| Hue | Same as blank | Same as blank | Same as blank | Same as blank |
| Smell | None | None | None | None |

|  | Comp. Ex. 20 | 21 | 22 | 23 | 24 |
|---|---|---|---|---|---|
| Additive | Ingredient No. 21 | Ingredient No. 21 | Ingredient No. 22 | Ingredient No. 22 | Ingredient No. 23 |
| Amount of additive | 0.5 phr | 0.3 phr | 0.5 phr | 0.3 phr | 0.5 phr |
| MFI | 4.16 | 3.87 | 4.74 | 4.41 | 4.62 |
| Hue | Same as blank | Same as blank | Faint Yellow | Faint Yellow | Faint Yellow |
| Smell | None | None | Slight | Slight | Slight |

In the column identified as "smell" in Table 4, "none" means that decomposition product of the organic peroxide had no odor and "smell" means that the decomposition product had an odor.

It should be noted that Comparative Examples 20–24 were performed according to the teaching of Canadian Patent 999,698 which teaches the use of peroxide deposited on clay to effect viscosity reduction of polypropylene. Examples 26–28 and 30 were performed according to the currennt invention. Comparison of the results at Table 4 illustrates the surprising superiority of the current method over that disclosed in Canadian Patent 999,698.

Since the MFI of the addition polymerization plastics can be modified by the after-processing according to the present invention, it becomes possible that the plastics are prepared under the most efficient conditions and the MFI of the products is modified as desired in the after-processing step. By this process, the efficiency of the plastic-producing process can be increased.

We claim:

1. A process for increasing the melt flow index of an addition polymerization plastic comprising:
   (i) mixing an addition polymerization plastic with an organic peroxide which has been previously adsorbed onto a zeolite to form a mixture;
   (ii) heating said mixture;
   wherein the melt flow index of said plastic is increased in comparison to its melt flow index prior to mixing with said organic peroxide.

2. The process of claim 1 characterized in that the formation of a mixture and the heat treatment of the mixture are performed in one step.

3. The process of claim 1 characterized in that the organic peroxide is selected from the group consisting of: di-t-butylperoxide, 2,5-dimethyl-2,5-di-t-butylperoxyhexane, dicumyl peroxide, α,α'-di(t-butylperoxyisopropyl)benzene, t-butylhydroperoxide, t-butylperoxybenzoate, benzoyl peroxide, t-butyl isopropyl percarbonate and methyl ethykl ketone peroxide.

4. The process of claim 1 characterized in that the zeolite is a natural zeolite selected from the group consisting of mordenite, erionite, clinoptilolite, heulandite and faujasite.

5. The process of claim 1 characterized in that the zeolite is a synthetic zeolite selected from the group consisting of synthetic zeolites A, X, Y, T and F, molecular sieves, and synthetic mordenite.

6. The process of claim 1, wherein said plastic is a linear saturated polymer in a form other than a plastisol, and is selected from the group consisting of polyethylene, low-density polyethylene, high-density polyethylene, polyvinyl chloride, polyvinyl acetate, polyvinyl fluoride, polystyrene, polymethacrylates, polypropylene, poly-α-methylstyrene, ethylene/vinyl acetate copolymer and styrene/acrylonitrile copolymer.

* * * * *

UNITED STATES PATENT AND TRADEMARK OFFICE
CERTIFICATE OF CORRECTION

PATENT NO. : 4,900,781

DATED : February 13, 1990

INVENTOR(S) : Yasuo HIRAI et al

It is certified that error appears in the above-identified patent and that said Letters Patent is hereby corrected as shown below:

IN THE SPECIFICATION:

Col. 1, line 59, change "th" to --the--.

Col. 2, line 16, change "color" to --coloring--.

Col. 3, line 22, change "contrarty" to --contrary--;

line 57, change "1,1di-t-butylperoxy-cyclohexane" to --1,1-di-t-butylperoxycyclohexane--.

Col. 4, line 18, change "concreate" to --concrete--; In Table 1, line 2, change "DIBP" (both occurrences) to --DTBP--.

Col. 6, line 28, change "(DDP)" to --(DOP)--.

IN THE CLAIMS:

Claim 3, col. 10, line 7, change "ethykl" to --ethyl--.

Signed and Sealed this

Twenty-ninth Day of January, 1991

*Attest:*

HARRY F. MANBECK, JR.

*Attesting Officer*      *Commissioner of Patents and Trademarks*